Aug. 1, 1967
R. B. BLACK
3,333,320
FLUID PRESSURE DEVICE FOR EJECTING BURS FROM THE CHUCKS
OF DENTAL HANDPIECES
Filed Sept. 16, 1965
2 Sheets-Sheet 1
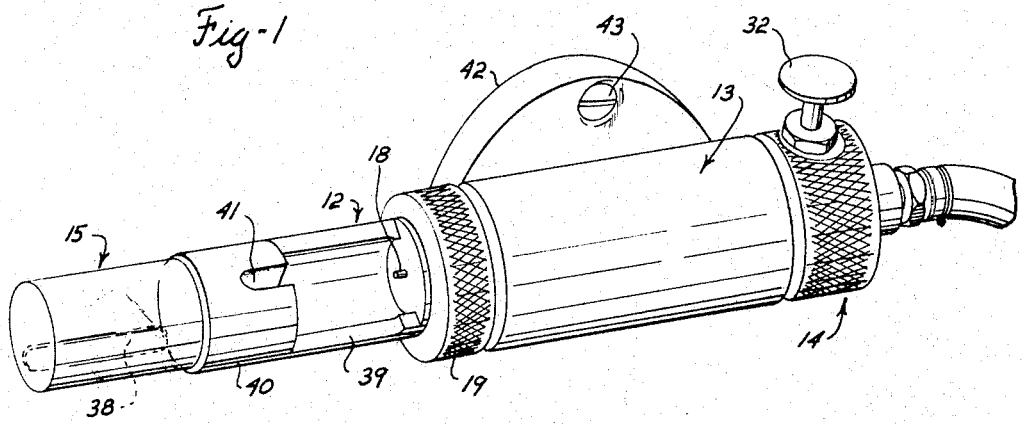
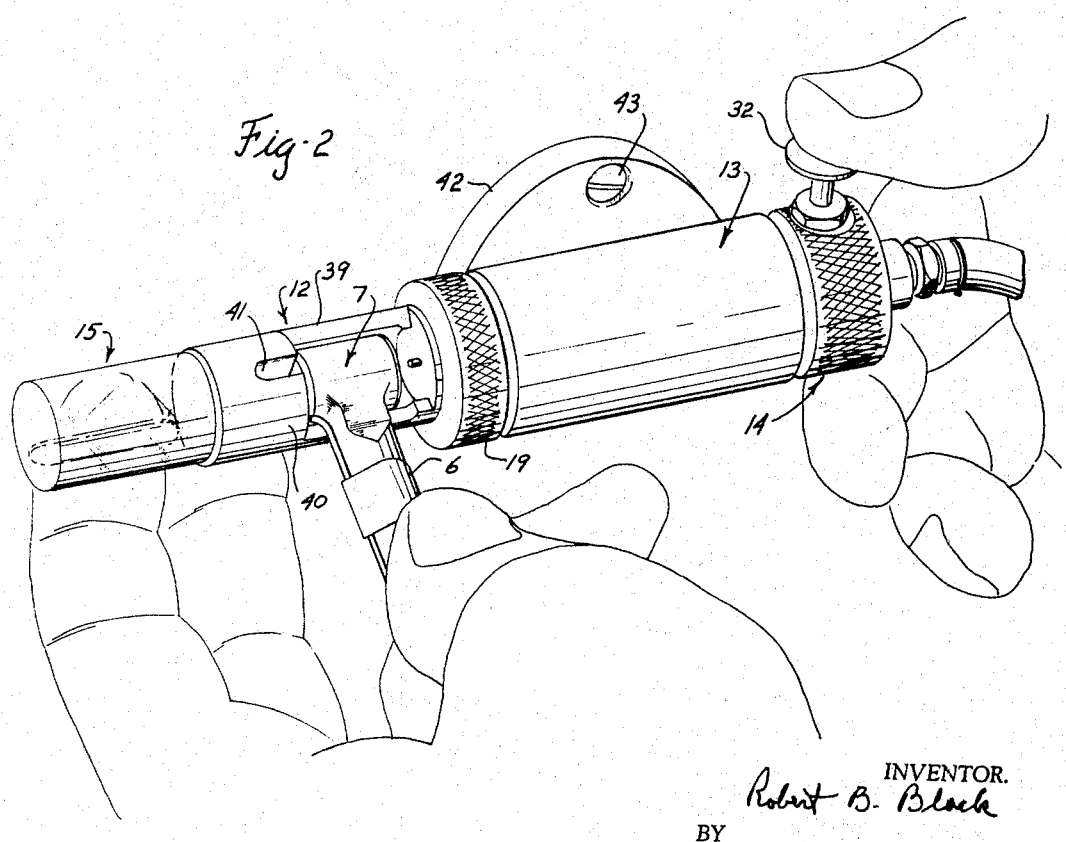
INVENTOR.
Robert B. Black
BY
ATTORNEYS

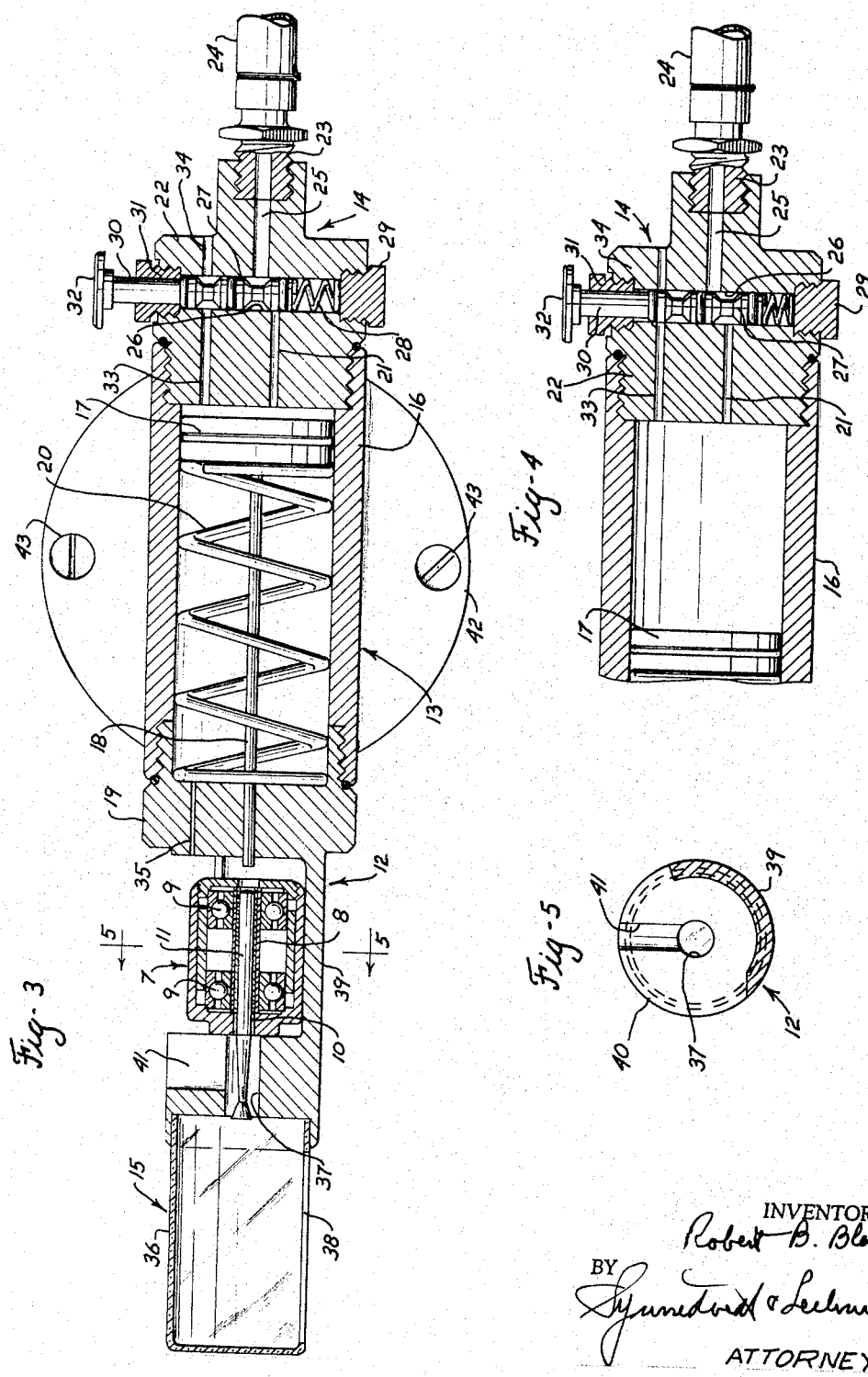

United States Patent Office 3,333,320
Patented Aug. 1, 1967

3,333,320
FLUID PRESSURE DEVICE FOR EJECTING BURS FROM THE CHUCKS OF DENTAL HANDPIECES
Robert B. Black, 125 Southern St., Corpus Christi, Tex. 78404
Filed Sept. 16, 1965, Ser. No. 488,837
6 Claims. (Cl. 29—252)

ABSTRACT OF THE DISCLOSURE

A fluid operated device for ejecting burs from chucks of dental handpieces, having a cradle to receive a dental handpiece and a transparent receptacle to receive a dental bur ejected by said device.

---

This invention relates to equipment adapted for use in ejecting burs or other rotary tools from the chuck provided in the head of a dental handpiece.

With modern high speed and ultra high speed dental handpieces, such as the air-driven handpiece which has come into wide use recently, a significant problem is present in connection with the removal of burs or other rotary tools from the chuck provided in the head of the handpiece. These chucks are ordinarily of friction type in which the shank of the bur is inserted, the fit of the shank in the friction chuck being sufficiently snug to provide the driving interengagement required. The chucks being of friction type ordinarily require application of some substantial pressure to the shank of the burs in order to eject the burs from the chucks. Prior devices provided for this purpose have at best been awkward and subject to a number of disadvantages including especially a tendency to result in puncturing of or injury to the dentist's hands or fingers. Still another disadvantage encountered with prior devices for this purpose is the fact that they tend at times to result in damage to or even breakage of the head of the handpiece, sometimes even breaking the head from the handpiece as a result of the force applied.

With the foregoing in mind, it is a principal object of the present invention to provide a simple and effective powered device for ejecting burs from the friction clutches of dental handpieces, the device being arranged at the same time to provide for accurate and sturdy positioning of the head of the handpiece, so as to avoid damage thereto and also provide for a controlled bur ejection action and thus also minimize injury to the dentist's hands.

Still another object of the invention is to provide a bur ejection device of the kind referred to adapted for convenient fingertip control and further adapted for convenient ejection of the bur and subsequent delivery thereof to the hand of the dentist, but without danger of injury to the dentist's hands.

How the foregoing and other objects and advantages are attained will appear more fully from the following description referring to the accompanying drawings illustrating the preferred embodiment of the invention and in which:

FIGURE 1 is an overall perspective view of the device of the invention;

FIGURE 2 is a view similar to FIGURE 1 but illustrating the manner of insertion of the head of the handpiece into the device of the invention, and of the typical fingertip operation of the device by the dentist's hands;

FIGURE 3 is a longitudinal sectional view through the device shown in FIGURES 1 and 2, this sectional view also illustrating in cross section a typical chuck and head of a dental handpiece with which the device of the invention is adapted to be employed for the ejection of burs or other rotary tools;

FIGURE 4 is a view similar to FIGURE 3 but illustrating only certain portions toward the right-hand end of the device, in order to show a different position of the fluid pressure control; and FIGURE 5 is a transverse sectional view through a portion of the device of the invention, taken as indicated by the section line 5—5 on FIGURE 3 but omitting any illustration of the chuck which appears in FIGURE 3.

In referring to the drawings, attention is first directed to the illustration in FIGURES 2 and 3 of certain portions of a typical chuck disposed in the head of a dental handpiece. Thus a part of the handpiece appears in FIGURE 2 at 6 and the head is shown at 7. A sleeve 8 is rotatively journaled within the head by means of bearing assemblies 9—9, this sleeve being adapted to be driven, for instance by a turbine associated therewith within the head in the space between the bearings 9—9. Within the sleeve 8 is a chuck 10, for instance a chuck of plastic or fibrous material, the chuck being non-rotative in the sleeve and being adapted to receive the shank 11 of a bur or other rotary dental tool. The chuck has a frictional engagement with the shank of the bur which is ordinarily quite snug and requires substantial force to release.

In general, the device of the present invention is made up of four structures. First, the device includes a cradle structure 12 adapted to receive the head of the dental handpiece and to position the chuck in cooperative relation to certain other parts as described herebelow. Second, the apparatus of the invention comprises a fluid pressure piston and cylinder device 13 constituting a powered mechanism for ejecting a bur or other tool from the chuck. Third, the device includes a fluid pressure control mechanism 14 for controlling the operation of the piston in the device 13. Finally, the apparatus includes a capsule 15 associated with the cradle 12 in position to receive the ejected bur.

The cylinder 16 contains a piston 17 having a piston rod 18 projecting through the cylinder head 19 in position to enter the chuck of a handpiece head received in the cradle 12. The piston 17 is urged toward the right as viewed in FIGURE 3 by means of a compression spring 20 which serves to effect the return or release stroke of the piston rod 18. The bur ejecting stroke of the rod 18 is accomplished by introduction of pressure fluid (for instance air) behind the piston 17, i.e., into the right-hand end of cylinder 16, such introduction of pressure fluid being accomplished through a port 21 provided in the cylinder head 22. This head has a fitting 23 associated therewith and arranged to provide a connection with a source of pressure fluid indicated by the pipe 24. The fluid supply passage 25 and the port 21 both communicate with a cylindrical valve chamber 26 in which reciprocable valve mechanism 27 is arranged. The valve mechanism 27 is urged in the upward direction (when viewed in FIGURES 3 and 4) by means of the spring 28 reacting against the closure plug 29 for the valve chamber. At the opposite end of the valve chamber a valve stem 30 projects through a packing gland or guide 31, the stem being provided with a convenient finger push button 32 by means of which the valve may be depressed to the position indicated in FIGURE 4.

When positioned as in FIGURE 3, the supply passage 25 is blocked, so that the fluid under pressure may not flow to the port 21, but upon depressing the button 32 the valve is shifted so as to establish communication from the supply passage 25 through the port 21 to the cylinder 16, thereby effecting the bur ejection stroke of the piston 17. When in the position of FIGURE 3, the port 33 is in communication with the exhaust port 34, so that the spring 20 may at this time readily return the piston 17 to the right thus effecting the release stroke of the piston rod 18. An exhaust port 35 is also provided in the head or closure 19 at the opposite end of the cylinder 16, so that the bur ejecting stroke will not be obstructed by compression of air in advance of the cylinder 17.

The structure 15 for receiving the ejected burs preferably comprises a cylindrical capsule 36 desirably made of transparent material, such for example as polyvinyl acetate. The left end of the capsule as viewed in the drawings is closed, but the right-hand end is in communication with a passage 37 provided in the cradle structure in order to receive the projecting bur mounted in the chuck and thus provide for ejection of the bur from the chuck into the capsule 36. At the lower side of the capsule 36 a slot or aperture 38 is provided under which the dentist may readily place fingers of the left hand in the manner illustrated in FIGURE 2 in order to receive the ejected bur when it drops out of the capsule 36.

The cradle 12 advantageously includes a semicylindrical wall 39 defining a recess adapted to loosely fit the head of the handpiece and thus position the head with reference to other parts of the apparatus. The cradle also includes a generally cylindrical portion 40 to which the capsule 36 is fastened and having a slot 41 positioned to pass the bur as the head is being inserted into the cradle.

It will be noted particularly from FIGURE 3 that the cradle is formed integrally with the head 19 of the cylinder 16 and further that the cradle wall 39 is arranged to support the head in position with the axis of the chuck in substantial alignment with the valve stem 18. Preferably the valve stem 18 projects slightly into the cradle space, so that the operator may readily adjust the position of the head, by shifting it to the right as viewed in FIGURE 3 until the tip of the piston rod 18 enters the right-hand end of the opening in the head adjacent to the chuck. By "feeling" the positioning of the handpiece in this manner the dentist may be assured that upon actuation of the button 32 the piston rod 18 will advance to engage the end of the bur shank within the chuck, rather than striking some adjacent portion of the head.

The device of the invention may be employed as a unit in unattached form, simply by laying on the instrument tray, but is provided with a mounting flange such as indicated at 42 so that the entire assembly may be fastened to a suitable support, as by screws 43 in a position most conveniently accessible to the dentist during his work.

Since dental offices are normally equipped with a supply of air under pressure it is convenient and advantageous to employ this source of fluid pressure to operate the device.

By virtue of the arrangement of the cradle associated with the cylinder, the head of the handpiece is squarely braced and positioned during the ejection operation, and this minimizes danger of damage to the chuck or other parts of the handpiece.

The arrangement of the invention also insures against puncturing of the fingers as a result of the ejection operation.

I claim:
1. Apparatus for use in removing a rotary dental tool from the chuck of the head of a dental handpiece, comprising a cradle for receiving the head of a handpiece, a tool-receiving capsule communicating with one end of the cradle, a fluid pressure piston and cylinder device at the opposite end of the cradle having a piston rod positioned to project from the cylinder into the chuck of a handpiece head behind a tool therein, and fluid pressure control means for actuating the piston and thus the piston rod to eject a tool from the chuck of a handpiece head into the tool-receiving capsule.

2. Apparatus according to claim 1 in which the cradle is laterally open at a side thereof between the capsule and the piston and cylinder device to provide for insertion and removal of the head of a handpiece in a direction transverse the direction of ejection of the tool from the chuck.

3. Apparatus according to claim 1 in which the capsule has a slotted side wall providing for removal of an ejected tool therefrom.

4. Apparatus for use in removing a rotary dental tool from the chuck of the head of a dental handpiece, comprising a fluid pressure cylinder having a piston therein with a piston rod projecting from one end of the cylinder, a cradle mounted at said end of the cylinder and adapted to receive the head of a handpiece with the axis of the chuck in alignment with the piston rod, and fluid pressure control means for the cylinder providing for introduction of pressure operating fluid behind the piston therein and thereby advance the piston rod into the chuck and thus eject a tool from the chuck.

5. Apparatus according to claim 4 in which the control means provides for introduction and release of pressure fluid into and from the end of the cylinder behind the piston and opposite to the cradle, the apparatus further including a return spring working against the opposite side of the piston to withdraw the piston rod from the chuck.

6. Apparatus according to claim 4 and further including a transparent capsule positioned at the side of the cradle remote from the cylinder, the interior of the capsule being in communication with the cradle to receive a tool ejected from the chuck of a handpiece head positioned in the cradle.

References Cited
UNITED STATES PATENTS

| 2,235,643 | 3/1941 | Pfauser | 29—252 |
| 2,627,654 | 2/1953 | King | 29—243 |
| 2,992,477 | 7/1961 | Duncan et al. | 29—243 |

WILLIAM FELDMAN, *Primary Examiner.*
MYRON C. KRUSE, *Examiner.*